United States Patent [19]

Maki et al.

[11] Patent Number: 5,681,607
[45] Date of Patent: Oct. 28, 1997

[54] PROCESS FOR ROASTING COFFEE BEANS WITH STEAM

[75] Inventors: Yoshiaki Maki, Suzuka; Tsutomu Haruyama, Mie-ken, both of Japan

[73] Assignee: Ajinomoto General Foods, Inc., Tokyo, Japan

[21] Appl. No.: 682,657

[22] PCT Filed: Jan. 28, 1994

[86] PCT No.: PCT/JP94/00116

§ 371 Date: Jul. 26, 1996

§ 102(e) Date: Jul. 26, 1996

[87] PCT Pub. No.: WO95/20325

PCT Pub. Date: Aug. 3, 1995

[51] Int. Cl.$^6$ .............. A23P 1/00; C12C 7/16; A23B 4/03; C12H 1/08
[52] U.S. Cl. .......... 426/595; 426/594; 426/511; 426/468; 426/466
[58] Field of Search ................. 426/595, 594, 426/511, 466, 468

*Primary Examiner*—Marian C. Knode
*Assistant Examiner*—Ali R. Salimi
*Attorney, Agent, or Firm*—Thomas A. Marcoux; Thomas R. Savoie

[57] ABSTRACT

An improved process for upgrading the quality of roasted coffee beans which comprises:

a) roasting green coffee beans with steam for a period of time from 50 to 300 seconds at a steam temperature of from 251° to 400° C. at a pressure of 6.5 to 20.0 bar G; and thereafter b) final roasting the beans from step (a) with steam for period of time ranging from 60 to 800 seconds at a steam temperature of from 251° to 400° C. at substantially atmospheric pressure conditions is disclosed.

9 Claims, 1 Drawing Sheet

PROCESS FOR ROASTING COFFEE BEANS WITH STEAM

CONTINUING DATA

This application is a 371 of PCT/JP94/0016 filed Jan. 28, 1994.

INDUSTRIAL FIELD OF USE

This invention relates to an improved process for roasting coffee beans and the roasted coffee products.

BACKGROUND OF THE INVENTION

In the process for producing of roast and ground coffee or soluble coffee, roasting of coffee beans is one of the important steps that determine the quality of the coffee.

Currently, devices which use hot air, combustion gas, far infrared rays, or microwave are under consideration for the roasting of coffee beans.

It is said that the flavor and taste of coffee are produced by a Maillard reaction, a reaction among saccharides, proteins containing terminal amino groups, amino acids, etc. contained in the coffee beans, and the properties of the coffee vary according to the contents and composition of the saccharides, proteins and/or amino acids contained.

It has been proposed to roast coffee beans under pressure with the use of superheated steam, thereby prompting hydrolysis in the coffee beans and upgrading the flavor and taste of the coffee so that the quality of roasted beans can be improved (see Japanese Laid Open Patent Publication No. 258347/1989). Roasting with superheated steam, however, tends to make the coffee much more sour, although it can lead to improved quality; for instance, it decreases the undesirable flavor of low grade beans (e.g. Coffee Robustas) and enhances the preferable flavor of high grade beans (e.g. Coffee Arabicas).

Coffee which has too strong sourness is generally not preferred by consumers. Of importance is therefore the development of a process which suppresses the increase in coffee sourness while enhancing its preferable flavor.

The process described in Japanese Laid Open Patent Publication No. 256347/1989 did not solve the above-mentioned problems. This process, therefore, was not able to make full use of the merit of roasting with steam.

U.S. Pat. No. 3,640,726 discloses a process for producing improved flavor Robusta coffee for use in a roast and ground coffee blend by separately steam roasting, and then postroasting Robusta coffee beans under particular conditions.

U.S. Pat. No. 4,540,591 discloses a method of steaming, roasting and blending Robusta coffee beans. The green Robusta beans are first contacted with steam under pressure in a vessel. The vessel is continuously vented at a pressure of between 1 psig and 5 psig. Next, the steamed Robusta beans may be either dried and subsequently roasted or roasted directly. Roasting in a bubbling bed or with steam under pressure is preferred so that heavy, roasted burnt notes are developed. The roasted Robusta coffee may then be blended with at least one type of roasted Arabica coffee.

EP-A-0 425 824 discloses a process for improving the quality of Robusta coffee by subjecting raw Robusta coffee beans which have been treated in such a way that the water content of said beans is between approximately 30% and 45%, for about 60 minutes to 120 minutes at a temperature of about 135° C. to 140° C. and at a pressure of about 3 bar to 4 bar to a steam treatment. After said steam treatment the coffee beans are treated and roasted in conventional manner.

U.S. Pat. No. 3,106,470 discloses a process for roasting whole green coffee beans comprising preheating of the beans at substantially atmospheric pressure, steam roasting the beans under pressure conditions, and postheating the beans at substantially atmospheric pressure.

MEASURE FOR SOLVING THE PROBLEMS

The inventors of this invention found out a process which comprises performing short-term pressure roasting of coffee with steam (preroasting), followed by roasting the coffee at atmospheric pressure or a slightly higher pressure to decrease the acids generated during said pressure roasting. This finding led them to accomplish the present invention.

This invention relates to an improved process for roasting green coffee beans which comprises:

a) roasting green coffee beans with steam for a period of time from 50 to 300 seconds, preferably 50 to 180 seconds at a steam temperature of from 251° to 400° C., preferably 251° to 300° C. at a pressure of 6.5 to 20.0 bar G, preferably 6.5 to 13.0 bar G; and thereafter b) final roasting the beans from step (a) with steam for a period of time ranging from 60 to 800 seconds at a steam temperature of from 251° to 400° C. at substantially atmospheric pressure conditions, preferably at 0 to 0.9 bar G.

DETAILED DESCRIPTION OF THE INVENTION

Figure 1:
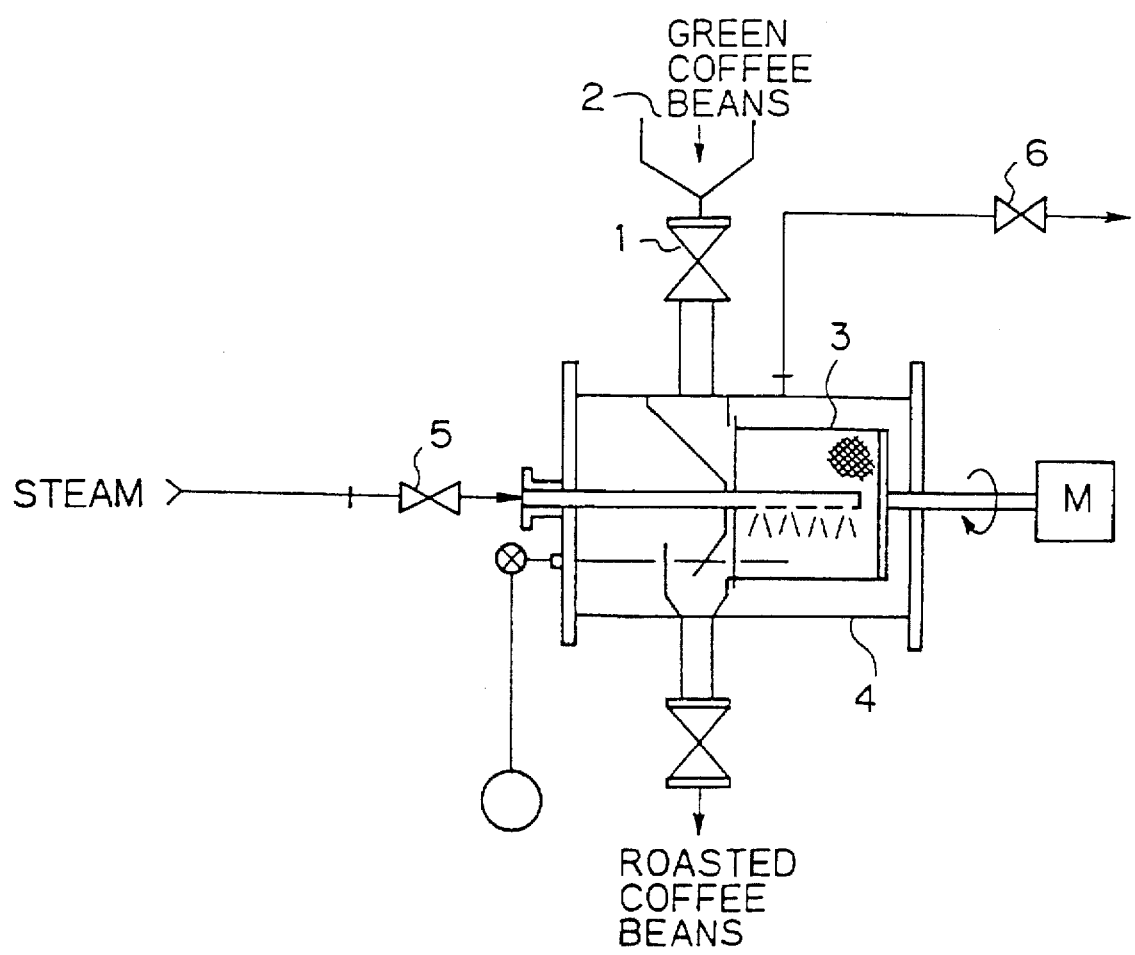
FIG. 1 is a flow sheet of a preferable device for carrying out the present invention.

Coffee beans are charged into a rotary roasting chamber mounted in a pressurizing container, and caused to flow therein. Steam is blown onto the rotating coffee beans through a nozzle inserted into the roasting chamber, to preroast the coffee beans under pressure for a short time.

When a temperature of the coffee beans in chamber has reached a predetermined temperature, the supply of steam is stopped, and the steam in the pressurizing container is vented until it approaches atmospheric pressure. Then, steam is fed again, and final roasting is performed at atmospheric pressure or a slightly higher pressure. Thereafter, when the temperature of the coffee beans in the roasting chamber has reached a predetermined temperature, the supply of steam is discontinued, and roasting is simultaneously terminated.

The roasting conditions are shown in Table 1:

TABLE 1

| | Preroasting | | Final Roasting |
|---|---|---|---|
| | | (Preferred Range) | |
| Roasting Pressure (bar G) | 6.5–20.0 | (6.5–13.0) | 0–0.9 |
| Temperature of steam fed (°C.) | 251–400 | (251–300) | 251–400 |
| Roasting time (sec) | 50–300 | (50–180) | 60–800 |

The roasting in the present invention is performed, for instance, using the apparatus as shown in FIG. 1 and preferably the steam fed is superheated. The reference numerals in this figure represent the following:

(1) Coffee bean charging valve
(2) Coffee bean charging hopper
(3) Roasting chamber
(4) Pressurizing container
(5) Steam feeding valve
(6) Pressure relief valve The green coffees include, for example, Robusta coffee, Arabica coffee or Brazilian coffee.

The roasting during step (a) may be stopped by releasing pressure prior to the final roasting of step (b).

PREFERABLE EMBODIMENTS

EXAMPLES: TWO-STAGE STEAM ROASTING

Example 1

Indonesian beans EK-1 (Coffee Robusta) were subjected to two-stage steam roasting using the roasting apparatus as shown in FIG. 1.

The coffee bean charging valve (1) was opened, and 1.0 kg of Indonesian beans EK-1 was charged from the charging hopper (2) into the roasting chamber (3). Then, the charge was preroasted for 2.5 minutes with superheated steam at a pressure of 8.5 bar G (gauge) and a steam temperature of 270° C., whereafter the supply of the superheated steam was stopped by closing the steam feeding valve (5).

After the pressure inside the roasting chamber (3) was released by opening a pressure relief valve (6), the steam feeding valve (5) was opened again. Final roasting was carried out for 1.3 minutes with superheated steam at a pressure of 0.5 bar G and a steam temperature of 270° C. to obtain 0.85 kg of roasted beans.

Example 2

Brazilian beans #4/5 (Coffee Arabica) were subjected to two-stage steam roasting using the roasting apparatus as shown in FIG. 1.

The coffee bean charging valve (1) was opened, and 1.0 kg of Brazilian beans #4/5 was charged from the charging hopper (2) into the roasting chamber (3). Then the charge was preroasted for 2.5 minutes with superheated steam at a pressure of 10.0 bar G and a temperature of 280° C., whereafter the supply of the superheated steam was stopped by closing the steam feeding valve (5).

After the pressure inside the roasting chamber (3) was released by opening the pressure relief valve (6), the steam feeding valve (5) was opened again. Final roasting was carried out for 1.3 minutes with superheated steam at a pressure of 0.5 bar G and a steam temperature of 280° C. to obtain 0.85 kg of roasted beans.

Example 3

Colombian beans (Coffee Arabica) were subjected to two-stage steam roasting using the roasting apparatus as shown in FIG. 1.

The coffee bean charging valve (1) was opened, and 1.0 kg of Colombian beans was charged from the charging hopper (2) into the roasting chamber (3). Then, the charge was preroasted for 2.5 minutes with superheated steam at a pressure of 13.0 bar G and a steam temperature of 285° C., whereafter the supply of the superheated steam was stopped by closing a steam feeding valve (5).

After the pressure inside the roasting chamber (3) was released by opening the pressure relief valve (6), the steam feeding valve (5) was opened again. Final roasting was carried out for 1.5 minutes with superheated steam at a pressure of 0.5 bar G and a steam temperature of 285° C. to obtain 0.85 kg of roasted beans.

Example 4

Indonesian beans EK-1 (Coffee Robusta) were subjected to two-stage pressure roasting using the roasting apparatus as shown in FIG. 1.

The coffee bean charging valve (1) was opened, and 1.0 kg of Indonesian beans EK-1 was charged from the charging hopper (2) into the roasting chamber (3). Then the charge was preroasted for 2.8 minutes with superheated steam at a pressure of 8.5 bar G and a steam temperature of 270° C., whereafter the supply of the superheated steam was stopped by closing the steam feeding valve (5).

After the pressure inside the roasting chamber (3) was released by opening the pressure relief valve (6), the steam feeding valve (5) was opened again. Final roasting was carried out for 1.5 minutes with superheated steam at a pressure of 0.5 bar G and a steam temperature of 270° C. to obtain 0.85 kg of roasted beans.

Example 5

Colombian beans (Coffee Arabica) were subjected to two-stage steam roasting using the roasting apparatus as shown in FIG. 1.

The coffee bean charging valve (1) was opened, and 1.0 kg of Colombian beans was charged from the charging hopper (2) into the roasting chamber (3). Then, the charge was preroasted for 1.2 minutes with superheated steam at a pressure of 8.5 bar G and a steam temperature of 290° C., whereafter the supply of the superheated steam was stopped by closing the steam feeding valve (5).

After the pressure inside the roasting chamber (3) was released by opening the pressure relief valve (6), the steam feeding valve (5) was opened again. Final roasting was carried out for 4.0 minutes with superheated steam at a pressure of 0.5 bar G and a steam temperature of 290° C. to obtain 0.85 kg of roasted beans.

CONTROL: CONVENTIONAL ROASTING

Control Run A 1.0 kg of Indonesian beans EK-1 (Coffee Robusta) was charged in a rotating chamber of a bench-top coffee roaster (Fuji Royal Type R-101) manufactured by Fuji Royal Corp, and roasted with a combustion gas of propane for 15 minutes to obtain 0.85 kg of roasted beans.

Control Run B 1.0 kg of Brazilian beans #4/5 (Coffee Arabica) was charged in a rotating chamber of a bench-top coffee roaster (Fuji Royal Type R-101) manufactured by Fuji Royal Corp, and roasted with a combustion gas of propane for 15 minutes to obtain 0.85 kg of roasted beans.

Control Run C 1.0 kg of Colombian beams (Coffee Arabica) was charged in a rotating chamber of a bench-top coffee roaster (Fuji Royal Type R-101) manufactured by Fuji Royal Corp, and roasted with a combustion gas of propane for 15 minutes to obtain 0.85 kg of roasted beans.

Control Run D 1.0 kg of Indonesian beans EK-1 (Coffee Robusta) was charged in a rotating chamber of a bench-top coffee roaster (Fuji Royal Type R-101) manufactured by Fuji Royal Corp, and roasted with a combustion gas of propane for 15 minutes to obtain 0.85 kg of roasted beans.

CONTROL: SINGLE-STATE STEAM ROASTING

Control Run E

Indonesian beans EK-1 (Coffee Robusta) were subjected to single-stage steam roasting using the roasting apparatus as shown in FIG. 1.

The coffee bean charging valve (1) was opened, and 1.0 kg of Indonesian beans EK-1 was charged from the charging hopper (2) into the roasting chamber (3). Then, the charge was roasted for 3.0 minutes with superheated steam at a pressure of 3.5 bar G and a steam temperature of 250° C., whereafter the supply of the superheated steam was stopped by closing the steam feeding valve (5).

The pressure inside the roasting chamber (3) was released by opening a pressure relief valve (6), to obtain 0.85 kg of roasted beans.

Control Run F

Brazilian beans #4/5 (Coffee Arabica) were subjected to single-stage steam roasting using the roasting apparatus shown in FIG. 1.

The coffee bean charging valve (1) was opened, and 1.0 kg of Brazilian beans #4/5 was charged from the charging hopper (2) into the roasting chamber (3). Then the charge was roasted for 3.0 minutes with superheated steam at a pressure of 3.5 bar G and a steam temperature of 250° C., whereafter the supply of the superheated steam was stopped by closing the superheated steam feeding valve (5).

The pressure inside the roasting chamber (3) was released by opening the pressure relief valve (6), to obtain 0.85 kg of roasted beans.

Control Run G

Colombian beans (Coffee Arabica) were subjected to single-stage steam roasting using the roasting apparatus as shown in FIG. 1.

The coffee been charging valve (1) was opened, and 1.0 kg of Colombian beans was charged from the charging hopper (2) into the roasting chamber (3). Then, the charge was roasted for 2.3 minutes with superheated steam at a pressure of 3.5 bar G and a steam temperature of 250° C., whereafter the supply of superheated steam was stopped by closing the steam feeding valve (5).

The pressure inside the roasting chamber (3) was released by opening the pressure relief valve (6), to obtain 0.85 kg of roasted beans.

Control Run H

Indonesian beans EK-1 (Coffee Robusta) were subjected to steam roasting using the roasting apparatus as shown in FIG. 1, and then to final roasting with hot gas by a conventional roasting method.

The coffee bean charging valve (1) was opened, and 1.0 kg of Indonesian beans EK-1 was charged from the charging hopper (2) into the roasting chamber (3). Then the charge was preroasted for 2.8 minutes with superheated steam at a pressure of 8.5 bar G and a temperature of 270° C. to obtain preroasted beans. They were further subjected to final roasting for a period of roasting time of 8.5 minutes by means of a bench-top coffee roaster (Fuji Royal Type R-101) manufactured by Fuji Royal Corp, to obtain 0.85 kg of roasted beans. This was without steam in the final roasting.

Control Run I

Colombian beans (Coffee Arabica) were subjected to single-stage pressure roasting using the roasting apparatus as shown in FIG. 1.

The coffee bean charging valve (1) was opened, and 1.0 kg of Colombian beans was charged from the charging hopper (2) into the roasting chamber (3). Then, the charge was roasted for 4.8 minutes with superheated steam at a pressure of 8.5 bar G and a steam temperature of 290° C., whereafter the supply of the superheated steam was stopped by closing the steam feeding valve (5).

The pressure inside the roasting chamber (3) was released by opening the pressure relief valve (6), to obtain 0.85 kg of roasted beans.

COMPARISON OF ROASTED BEANS

The resulting roasted coffee beans were ground by a conventional method, and extracted over a funnel with a filter paper using 175 grams of boiling water for 10 grams of ground coffee. The extract was evaluated, and the following results were obtained.

Method of Evaluating Flavor and Taste

The quality of the extract was evaluated by seven (7) expert panelists in accordance with our evaluation method. With the score of the roasted beans obtained by conventional roasting being set at zero (0), the beans resulting after superheated steam roasting and those resulting after two-stage pressure roasting were evaluated by the following scale of five (5) grades:

| Score | Evaluation |
| --- | --- |
| −2 | Considerably weak |
| −1 | Slightly weak |
| 0 | Comparable |
| +1 | Slightly strong |
| +2 | Considerably strong |

Method of Determining an Extraction Efficiency

A container containing 10 grams of ground roasted beans was charged with 170 grams of boiling water. Then, the ground coffee was extracted with stirring in a bath controlled at a temperature of 95° C., whereafter the weight was divided by the weight of the ground coffee (10 grams), and the value obtained was used to determine an extraction efficiency. This value for conventional roasting was taken to represent an extraction efficiency of 100. The extraction efficiency for single-stage steam roasting and that for two-stage pressure roasting were determined by the ratios of the above-mentioned values obtained with both roasting methods to said value for conventional roasting.

Analytical Methodologies (1) Determination of Volatile Flavor Compounds

2-Methylisoborneol (MIB) was measured according to reference (1). Pyrazines, E-2-Nonenal, and E,E-2,4-Decadienal were measured by Gas Chromatography-Mass Spectrometry after isolation of the volatiles by simultaneous distillation/extraction (SDE) according to reference (2).

| References: | (1) | Bade-Wegner, H.; Holscher, W.; Vitzthum, O.G.; Quantification of 2-Methylisoborneol in Roasted Coffee by GC-MS. 15° Colloque, Montpellier, 1993, ASIC, Paris, p. 537 ff (1993). |
|---|---|---|
| | (2) | Boosfeld, J.; Bade-Wegner, H.; Balzer, H.; Holscher, W.; Vitzthum, O.G.; Characterisation of Unsaturated Aldehydes in Green Coffee. 15° Colloque, Montpellier, 1993, ASIC, Paris, p. 550 ff (1993). |

(2) pH and Titratable Acidity (TA)

They were measured in a beverage that was prepared by adding 130 ml of boiling distilled water to 7.00 grams of ground coffee. The mixture was left alone for exactly 5 minutes. After cooling down to room temperature, distilled water was added back to exactly 137 grams. The brew was filtered off and the pH was measured at 20° C. 25 ml of the filtrate were used for TA and diluted with 25 ml water. The acidity was titrated to end point 6.0 with 0.1 n NaOH.

Calculation:

$$TA = \frac{ml\ of\ 1.0\ n\ NaOH}{100\ grams\ of\ dry\ matter}$$

$$= \frac{ml \times 137 \times 0.1 \times 100 \times 100}{25 \times 7 \times Dry\ Matter}$$

(3) The color of coffee is determined by grinding the roasted coffee and screening it using U.S. No. 50 and pan. The portion that passes through U.S. No. 50 and is retained on pan is collected, placed in a container of 1½ inch diameter and ½ inch deep and pressed under 1,200 psi with a 1⅜ inch ram. The pressed coffee is placed beneath a photoelectric search unit of the color measuring device and the difference in reflected light at 595 mµ between a standard color plate and the coffee is indicated as color units on the scale of that instrument. When a lightly roasted coffee is placed beneath the search unit, the light reflectance is greater than the standard and the needle moves to a higher reading.

The color measuring device is a photoelectric reflection Model 610 having a model y10-Y search unit, manufactured by Photovolt Company. The standard color plate employed is a ceramic plate of brown color and hue. The standard brown plate exhibits the following reflection curve using magnesium oxide to represent 100 percent reflection.

TABLE 2

| REFLECTANCE | |
|---|---|
| Wave Length mµ | Percent Reflection % |
| 580 | 14.0 |
| 600 | 17.0 |
| 620 | 21.4 |
| 650 | 26.0 |
| 700 | 24.3 |

TABLE 2-continued

| Results of flavor/taste evaluation | | | |
|---|---|---|---|
| | Conventional roasting (Control Run A) | Single-stage steam roasting (Control Run E) | Two-stage steam roasting (Ex. 1) |
| Coffee beans | Indonesian EK-1 | Indonesian EK-1 | Indonesian EK-1 |
| Extraction efficiency | 100 | 115 | 116 |
| Flavor | | | |
| Cereal | 0 | −1 | −2 |
| Silage | 0 | 0 | +1 |
| Fragrant nutty flavor | 0 | −1 | +1 |
| Taste | | | |
| Sour | 0 | +2 | +1 |
| Bitter | 0 | 0 | 0 |
| Astringent | 0 | 0 | 0 |

According to two-stage steam roasting, an undesirable flavor (Cereal flavor) characteristic of coffee Robusta was markedly reduced, and the increase in sourness was suppressed in comparison with single-stage steam roasting.

TABLE 3

| Results of Analysis | | | |
|---|---|---|---|
| | Conventional roasting (Control Run A) | Single-stage steam roasting (Control Run E) | Two-stage steam roasting (Ex. 1) |
| Coffee beans | Indonesian EK-1 | Indonesian EK-1 | Indonesian EK-1 |
| MIB (ng/kg) | 300–400 | 310 | 70 |
| (E)-2-nonenal (µg/kg) | 300 | 260 | 195 |
| (E,E)-2,4-decadienal (µg/kg) | 550 | 530 | 470 |
| pH | 5.69 | 5.42 | 5.47 |
| TA (end pH = 6.0) | 1.70 | 3.75 | 2.94 |

Coffee Robusta and Coffee Arabica are the most important botanical varieties. They show characteristic sensory differences. Robustas are usually grown in lower altitudes and higher air humidity. The Robusta flavor exhibits stronger harshness, with cereal, musty flavor sometimes referred to by investigators as earthy.

The local flavor preference is varying. Robustas are generally preferred in France or Italy whereas the consumer in USA, Japan or the Middle of Europe preferrers the milder and more fruity flavor of Arabicas. Especially in these countries a lot of technical efforts have been made to utilize the remarkable price differences between Arabica and Robusta and removing the undesirable cereal, musty notes of Robustas. Quite recently, one major off flavor causing agent was identified as MIB [reference 3].

Although occurring in traces, MIB is a powerful odorant and causes cereal and musty off notes due to its extremely low odor thresholds going down to 2.5–5 parts per trillion in coffee beverages. A test method to achieve a quite reliable quantification of MIB in roasted coffee in the ppt-level was developed only recently [reference 1].

The results in the previous table indicate that the MIB level is significantly lower in two-stage roasted Example 1 (70 ng/kg) compared with single-stage roasted Control Run E (310 ng/kg). A value of 310 ng/kg is within the range of naturally occurring levels of MIB in roasted Indonesian Robusta [reference 1].

As indicated by the previous table, a further advantage of two-stage steam roasting is demonstrated by a stronger reduction of undesirable unsaturated aldehydes such as (E)-2-nonenal or (E,E)-2,4-decadienal compared with a conventional roasting and a single-stage steam roasting.

These unsaturated aldehydes are break-down products of lipid oxidation and were identified in roasted coffee as major contributors to undesirable woody, cardboard-like or oily off notes in coffee [references 2, 4, 5].

The previous table also reveals that two-stage steam roasting of Robustas provides the opportunity of creating selectively lower acidity which is indicated by significantly lower TA and slightly higher pH. The differences in pH score are sensorily significant as the human taste sense is able to distinguish pH differences of about 0.03 units [reference 8]. According to literature, the titratable acidity titrated to end point pH 6.0 correlates best to the human perception of coffee acidity [reference 7].

| References: | [3] | Vitzthum, O.G.; Weisemann, C.; Becker, R.; Köhler, H.S.; Cafe, Cacao, The,, Vol. XXXIV, 27–36, 1990. |
|---|---|---|
| | [4] | Holscher, W.; Vitzthum, O.G.; Steinhart, H.; Identification and sensorial evaluation of aroma-impact-compounds in roasted Colombian coffee. Cáfe, cacao, The 34, 205–212 (1990) |
| | [5] | Parliment, T.H.; Clinton, W.; Scarpellino, R.; J. Agric. Food Chem. 21, 485–487 (1973) |
| | [6] | Sivetz, M.; Food Technology. 26 (5), 70–77 (1972) |
| | [7] | Maier, H.G.; Balcke, C.; Thies, F.C.; Lebensm. Chem. Gerichtl. Chem. 37, 81–83 (1983) |

TABLE 4

| | Conventional roasting (Control Run D) | Steam-gas roasting (Control Run H) | Two-stage steam roasting (Ex. 4) |
|---|---|---|---|
| Coffee beans | Indonesian EK-1 | Indonesian EK-1 | Indonesian EK-1 |
| Extraction efficiency | 100 | 102 | 116 |
| Flavor | | | |
| Cereal | 0 | −1 | −2 |
| Silage | 0 | +1 | +3 |
| Fragrant nutty flavor | 0 | 0 | +2 |
| Taste | | | |
| Sour | 0 | +1 | +1 |
| Bitter | 0 | 0 | 0 |
| Astringent | 0 | 0 | 0 |

According to two-stage steam roasting, an undesirable flavor (Cereal flavor) characteristic of Coffee Robusta was reduced, and a fragrant nutty flavor was felt markedly.

TABLE 5

Results of flavor/taste evaluation

| | Conventional roasting (Control Run B) | Single-stage steam roasting (Control Run F) | Two-stage steam roasting (Ex. 2) |
|---|---|---|---|
| Coffee beans | Brazilian #4/5 | Brazilian #4/5 | Brazilian #4/5 |
| Extraction efficiency | 100 | 113 | 116 |
| Flavor | | | |
| Floral | 0 | −2 | +2 |
| Silage | 0 | −1 | −1 |
| Fragrant nutty flavor | 0 | 0 | +2 |
| Taste | | | |
| Sour | 0 | +1 | 0 |
| Bitter | 0 | 0 | 0 |
| Astringent | 0 | 0 | 0 |

According to two-stage steam roasting, a floral flavor (favorite flavor) was markedly increased, and a fragrant nutty flavor was present. Sourness was suppressed to the same level as in a conventional roasting method.

TABLE 6

| | Conventional roasting (Control Run C) | Single-stage steam roasting (Control Run G) | Two-stage steam roasting (Ex. 3) |
|---|---|---|---|
| Coffee beans | Colombian | Colombian | Colombian |
| Extraction efficiency | 100 | 104 | 105 |
| Flavor | | | |
| Floral | 0 | 0 | +1 |
| Silage | 0 | 0 | 0 |
| Fragrant nutty flavor | 0 | 0 | +1 |
| Taste | | | |
| Sour | 0 | +1 | 0 |
| Bitter | 0 | 0 | 0 |
| Astringent | 0 | 0 | 0 |

According to two-stage steam roasting, a preferable floral flavor characteristic of Colombian beans was enhanced, and a fragrant nutty flavor was also felt strongly. Sourness was suppressed to the same level as in a conventional roasting method.

TABLE 7

Results of flavor/taste evaluation

|  | Conventional roasting (Control Run C) | Single-stage steam roasting (Control Run G) | Single-stage steam roasting (Control Run I) | Two-stage steam roasting (Ex. 5) |
|---|---|---|---|---|
| Coffee beans | Colombian | Colombian | Colombian | Colombian |
| Flavor | | | | |
| Floral | 0 | 0 | −1 | +2 |
| Silage | 0 | 0 | +1 | +1 |
| Fragrant nutty flavor | 0 | 0 | −1 | +1 |
| Taste | | | | |
| Sour | 0 | +1 | +1 | +1 |
| Bitter | 0 | 0 | 0 | 0 |
| Astringent | 0 | 0 | 0 | 0 |

As judged by an expert taste panel, the two-stage steam roasting treatment increased a floral character in a Colombian Arabica coffee producing an overall character more like a strictly high grown Arabica (e.g. Costa Rican Strictly High Grown Beans, Guatemalian Strictly High Grown Beans and/or Kenyan).

TABLE 8

Results of Analysis

|  | Conventional roasting (Control Run C) | Single-stage steam roasting (Control Run G) | Single-stage steam roasting (Control Run I) | Two-stage steam roasting (Ex. 5) |
|---|---|---|---|---|
| Coffee beans | Colombian | Colombian | Colombian | Colombian |
| Pyrazines (μg/kg) | 3290 | 1660 | 3180 | 5140 |
| (E,E)-2,4-decadienal (μg/kg) | 240 | 270 | 100 | 140 |
| pH | 5.05 | 4.84 | 4.65 | 4.92 |
| TA (end pH = 6.0) | 7.78 | 10.83 | 12.86 | 8.90 |

This analysis confirms that the two-stage pressure roasting reduces the increase in sourness (as indicated by pH and TA) while producing an increase in the floral character (as indicated by an increase in the desirable Pyrazine level with a decrease in the level of undesirable (E,E)-2,4-decadienal).

A series of experiments on Colombian green coffee were conducted comparing the present invention with the conditions set forth in the Japanese Laid Open Patent Publication No. 256347/1989 versus roasted Colombian standard.

Six (6) separate experimental runs were conducted replicating the conditions of the present invention (Test Samples 1–6). In all of these six runs the superheated steam temperature within preroasting and final roasting was set at 290° C. The pressure within the preroasting was set at 8.5 bar G and the final roasting was 0.5 bar G. The preroasting and the final roasting times as well as the total pyrazines and Titratable Acidity values of the roasted samples are set forth in the table below. Also three (3) separate experimental runs of single-stage roasting were conducted within the conditions set forth in the Japanese Laid Open Patent Publication No. 256347/1989 utilizing a steam temperature set up at 250° C. and five (5) separate experimental runs were conducted at 8.5 bar G steam temperature set up at 290° C. without a second roasting stage.

Table 9 below sets forth the roasting time, pressure and the total pyrazine and the titratable acidity values of the two-stage and the single-stage roasting samples. Also included is a conventional roasted Colombian sample which consisted of 15 minutes roasting time to a 55 Roast Color.

As the results indicate the titratable acidity of the samples produced according to the invention were increased from 7.78 to 8.83 TA. This compares favorably to the unacceptably high TA result of 11.12 and the 12.44 achievable in single-stage roasting.

The single-stage roasting samples were reported by a trained taste panel to be noticeably sour. The samples produced by the teachings of the present invention possessed a pleasant fruity-floral character which can be demonstrated analytically by the total pyrazine numbers which were significantly higher versus the single-stage roasting samples.

TABLE 9

|  | Total Pyrazines (μg/kg) | TA | Roast Color (L) | Pre Roast Time (sec) | Final Roast Time (sec) | Total Roast Time (sec) | Pre Roast Press (bar G) | Final Roast Press (bar G) |
|---|---|---|---|---|---|---|---|---|
| Two-Stage Sample # Present Invention | | | | | | | | |
| 1 | 4445 | 7.85 | 58.5 | 52 | 332 | 384 | 8.5 | 0.5 |
| 2 | 4560 | 9.08 | 59.7 | 75 | 256 | 331 | 8.5 | 0.5 |
| 3 | 5140 | 8.90 | 60.6 | 71 | 237 | 308 | 8.5 | 0.5 |
| 4 | 6015 | 9.39 | 59.3 | 87 | 215 | 302 | 8.5 | 0.5 |

TABLE 9-continued

|  | Total Pyrazines (μg/kg) | TA | Roast Color (L) | Pre Roast Time (sec) | Final Roast Time (sec) | Total Roast Time (sec) | Pre Roast Press (bar G) | Final Roast Press (bar G) |
| --- | --- | --- | --- | --- | --- | --- | --- | --- |
| 5 | 1750 | 8.73 | 59.0 | 99 | 192 | 381 | 8.5 | 0.5 |
| 6 | 7085 | 9.05 | 55.6 | 116 | 120 | 236 | 8.5 | 0.5 |
| Average of 1–6 | 4830 | 8.83 | | | | | | |
| Standard | 3290 | 7.78 | 55.0 | — | — | 900 | — | — |
| | | | Pat. Laid Open No. 256347/1989 | | | | | |
| Single-Stage Sample # | | | | | | | | |
| 1 | 1660 | 10.83 | 60.0 | — | — | 144 | — | 3.5 |
| 2 | 1750 | 10.55 | 55.0 | — | — | 130 | — | 4.5 |
| 3 | 1565 | 11.98 | 56.0 | — | — | 177 | — | 6.0 |
| Average of 1–3 | 1660 | 11.12 | | | | | | |
| Single-Stage Sample # 290° C. 8.5 bar G | | | | | | | | |
| 1 | 3220 | 12.44 | 57.5 | — | — | 138 | — | 8.5 |
| 2 | 3305 | 12.00 | 59.8 | — | — | 197 | — | 8.5 |
| 3 | 3180 | 12.86 | 60.6 | — | — | 290 | — | 8.5 |
| 4 | 2673 | 12.88 | 55.4 | — | — | 299 | — | 8.5 |
| 5 | 2475 | 11.79 | 61.0 | — | — | 355 | — | 8.5 |
| Average of 1–5 | 2971 | 12.44 | | | | | | |

EFFECTS OF THE INVENTION (1) According to the present invention, an undesirable flavor (cereal flavor) of Robusta beans (e.g. Indonesian EK-1), low grade beans, is reduced noticeably.

(2) Coffee beans with a full flavor are obtained in which a preferable flavor (floral/nutty) of Coffee Arabica beans (e.g. Brazilian #4/5, Colombian, etc), high-grade beans, is enhanced remarkably.

(3) Coffee beans with a rich taste are obtained which are free from a high sour taste observed with a single-stage roasting method using superheated steam.

(4) Coffee beans with a high extraction efficiency and uniformly roasted are obtained.

We claim:

1. An improved process for roasting green coffee beans which comprises:

a) roasting green coffee beans with steam for a period of time from 50 to 300 seconds at a steam temperature of from 251° to 400° C. at a pressure of 6.5 to 20.0 bar G; and thereafter b) final roasting the beans from step (a) with steam for a period of time ranging from 60 to 800 seconds at a steam temperature of from 251° to 400° C. at substantially atmospheric pressure conditions.

2. The process according to claim 1 wherein the steam temperature in step (a) is from 251° to 300° C. and the period of time of step (a) is from 50 to 180 seconds.

3. The process of claim 1 wherein substantially atmospheric pressure of step (b) varies from 0 to 0.9 bar G.

4. The process of claim 1 or 2 wherein the pressure in step (a) is from 6.5 to 13.0 bar G.

5. The process of claim 1 wherein the green coffee comprises Robusta coffee.

6. The process of claim 1 wherein the green coffee comprises Arabica coffee.

7. The process of claim 1 wherein the green coffee comprises Brazilian coffee.

8. The process of claim 1 wherein the steam in step (a) is superheated steam.

9. The process of claim 1 wherein the roasting during step (a) is stopped by releasing pressure prior to the final roasting of step (b).

* * * * *